Aug. 2, 1966 — G. H. ROACH — 3,264,388
METHOD OF CONTINUOUSLY HOT PRESSING
POWDERED REFRACTORY MATERIAL
Filed Feb. 2, 1962

INVENTOR.
GEORGE H. ROACH
BY James E. Toomey

Aug. 2, 1966

G. H. ROACH 3,264,388

METHOD OF CONTINUOUSLY HOT PRESSING
POWDERED REFRACTORY MATERIAL

Filed Feb. 2, 1962

*INVENTOR.*
GEORGE H. ROACH

BY *James E. Toomey*

United States Patent Office 3,264,388
Patented August 2, 1966

3,264,388
METHOD OF CONTINUOUSLY HOT PRESSING POWDERED REFRACTORY MATERIAL
George H. Roach, Santa Clara, Calif., assignor to Kaiser Aluminum & Chemical Corporation, Oakland, Calif., a corporation of Delaware
Filed Feb. 2, 1962, Ser. No. 170,725
3 Claims. (Cl. 264—125)

This invention relates to an improved method for the fabrication of articles from powdered materials. More particularly, the invention relates to new and improved method and apparatus for hot pressing and fabricating articles from powdered material.

In recent years, there has been an increasing demand in industrial and research applications for materials that would withstand severe conditions, such as high temperature, oxidizing and other corrosive conditions, etc., more satisfactorily than conventional materials. Considerable research effort has been devoted to producing materials of good high temperature properties, as well as high strength. Many super refractory materials, such as the refractory hard metals, refractory oxides and cermets, have been developed for high temperature service which may additionally require high strength properties, resistance to corrosive and oxidizing conditions and resistance to thermal shock. Improved metal and alloy shapes, produced by powder metallurgical techniques, have been developed and find use in applications where the environments are such as to render the same metals and alloys in the cast or wrought state totally unsuitable.

The expression "refractory hard metals" is one commonly known in the art; it refers to high melting hard substances of a metallic nature which are, however, technically inorganic compounds. "Refractory hard metal" materials include the refractory carbides, borides, nitrides and silicides of metals in the fourth to sixth groups of the periodic chart. Among the more important materials of this type are the carbides and borides of titanium, zirconium, niobium, tantalum and mixtures thereof.

The term "cermets" is generally used to denote an aggregate type of material composed of metals and ceramics having properties in an intermediate range between the basic constituents. "Refractory oxides" includes ceramic materials, such as beryllia, magnesia, zirconia and alumina.

The fabrication of these materials into the desired shapes has been by powder metallurgical techniques, such as (1) slip casting, extruding or cold pressing followed by firing or sintering or (2) hot pressing wherein the compacting and pressing is accomplished simultaneously with the firing or sintering step. It is the hot pressing technique to which this invention is directed.

In many applications the fabricated body or shape must have high strength and hardness properties, which properties depend largely upon the degree of porosity in the sintered body. Hot pressing can produce a dense body, pressed to size without warpage and shrinkage from heating. Cavities, formed by bridging of powders during the pressing operations, are minimized by the elevated temperatures and pressures used in hot pressing. Consequently, hot pressing is frequently employed where the fabricated body must meet certain requirements of strength and hardness.

In hot pressing, powdered material is introduced into a mold cavity which is equipped with pressure applying means. The pressure may be applied by a variety of means; however, hydraulic or pneumatic rams are usually preferred because of adjustability and ease of control. The hot pressing furnace may be either of a horizontal type or of a vertical type. Two types of electrical heating are commonly used in hot pressing furnaces, namely, resistance heating and high-frequency induction heating. In the hot pressing technique heretofore and currently practiced, the furnace is loaded with the powdered material and then pressure and heat from the electrical heating means are simultaneously applied. During the heating up of the charge in the mold or die, pressure is gradually applied to the powder until the full molding pressure is attained. The heating period (heating of the furnace die and charges) requires a relatively substantial amount of time, for example, one hour to three hours in the usual case, depending on the size of the furnace. After the required temperature is attained, the powder is maintained at the sintering temperature for a considerable period of time ranging up to one hour. After sintering, the article is kept in the furnace for a cooling down period. This may also range up to several hours. In many instances, the capacity of a hot press would be limited to one pressing per 8-hour shift. A large part of the time is involved in heating up and cooling down, where the use of pressure is not essential to the production of quality bodies or shapes. This represents a waste of productive capacity as the press is tied up whether or not it is exerting pressure. The present invention provides a method for hot pressing articles at a considerably increased rate, thereby reducing the production cost of hot pressed articles.

Other features and advantages of the invention may become apparent from the ensuing description and drawings which are shown by way of example, and the invention is not to be construed as limited thereto.

The present invention provides an improved method for increasing the productive capacity of hot pressing furnaces, including the steps of periodically charging increments of powdered material into an open end elongated die, subjecting the powdered material to pressure while simultaneously raising the material to the sintering temperature, maintaining the material at the sintering temperature while further subjecting the material to pressure for a time sufficient to obtain a solid compacted body, the pressure being released periodically for the charging of additional increments of powdered material thereby causing the powder to move progressively in said die and the solid body compacted therefrom to progressively emerge from said die. The invention further contemplates the separating of the increments of powdered material charged to the die so that solid, compacted bodies are made and progressively emerge from the die. The invention also includes the cooling of the body or bodies in protected zones.

Also, the present invention provides for the novel use of a die for continuously hot pressing bodies; said die comprised of an elongated body member having one portion thereof provided with an elongated internal passageway with cross-sectional dimensions and a cross-sectional configuration commensurate with those of the bodies to be produced; the other or remaining portion of said body member provided with an elongated internal passageway which is in open communication and alignment with said first named internal passageway, the second named passageway having cross-sectional dimensions and a cross-sectional configuration substantially greater than the passageway of said first named portion.

The accompanying drawings illustrate a suitable exemplary hot pressing apparatus for carrying out the instant invention.

Figure 1:
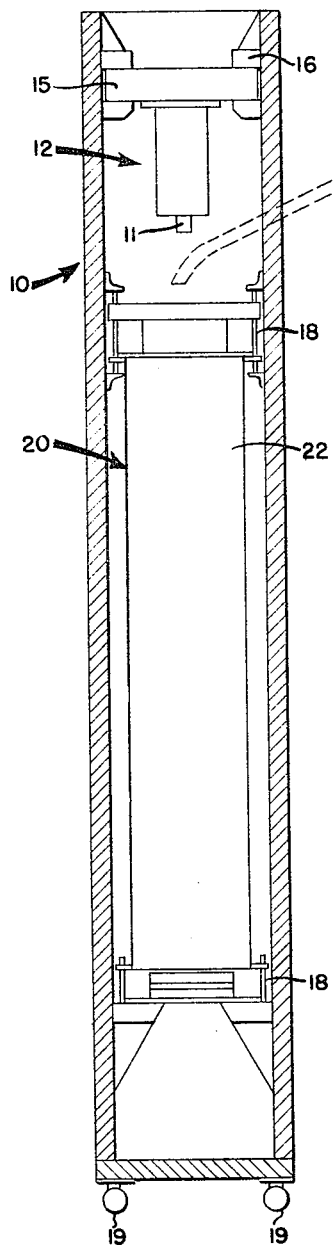
FIG. 1 is a front elevation view partly in section, showing a vertically positioned hot press furnace of a type suitable for carrying out the invention.

The apparatus as shown in FIG. 1 is of a vertically positioned hot press which is suitable for carrying out the invention, however, it is not to be construed that the invention is limited thereto. The apparatus in FIG. 1 generally consists of several components including a frame supporting structure 10, a furnace assembly 20, and hydraulic pressure transmitting means 12. The frame structure 10, preferably of steel, is vertically positioned and supports the principal operating components. The hydraulic cylinder assembly 12, including extendable piston rod 11, is mounted near the top of frame structure 10. The furnace assembly 20 is mounted on the frame 10 below the hydraulic cylinder assembly 12 and coincident with the center line of hydraulic cylinder assembly 12. The furnace assembly contains the die in which the hot pressing is performed. The hydraulic cylinder assembly 12 is mounted on a bridge 15 which may be stationary or, alternatively, hinged to frame bracket 16 so as to be capable of rotating out of the way for access to the top of the furnace 20. Furnace 20 is supported by the frame structure 10 and is held in position at the top and bottom by pins and bracket assemblies 18 suitably attached, such as by welding, to the frame 10. The frame supporting structure 10 may be fixedly placed, or it may be provided with casters, such as casters 18, for ease of movement when disassembly is necessary.

Any suitable feeding system for feeding controlled amounts of powdered material to the furnace assembly may be used. A feed hopper and chute are shown in phantom in FIG. 1 for feeding powdered material to the furnace assembly 20.

Figure 2:
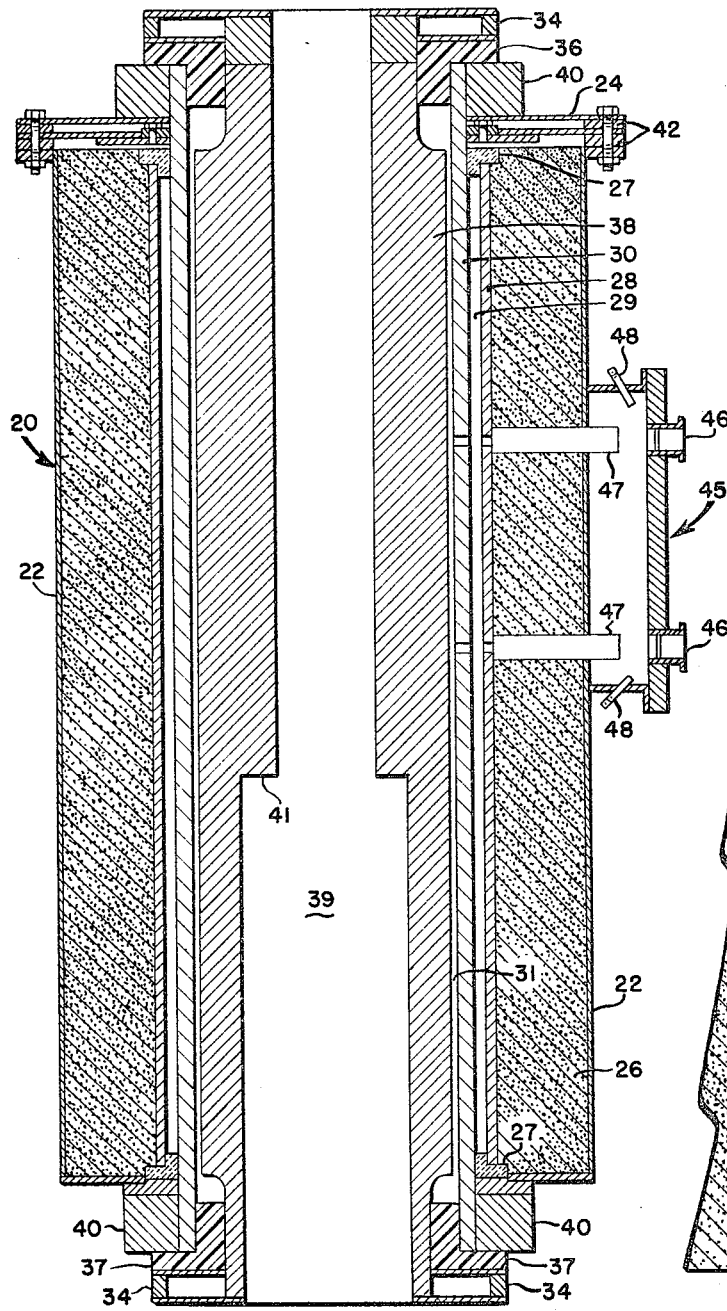
FIG. 2 is a longitudinal cross-sectional view of the furnace assembly of the apparatus shown in FIG. 1.

The furnace assembly 20 is shown in more detail in FIG. 2 and comprises a shell 22, which preferably is of steel, with lid or cover plate 24, and contains lampblack insulation 26 immediately within. The lampblack insulation 26 extends inwardly to a graphite sheath 28 which is spaced from the resistor heating tube 30, also of graphite, by ceramic rings 27, leaving insulating gas space 29. The heating tube 30 is electrically connected to power supplying terminal blocks 40 and is insulated from the steel lid or cover plate 24 by discs 42 of any suitable insulating material. The heating tube 30 is electrically insulated from the die 38 at the top and bottom by packing flanges 36 and 37, respectively, which are composed of any suitable insulating material. Water-cooled copper rings 34 are installed in contact with each end of the die 38 to maintain these ends below oxidation temperature during the hot pressing cycle. Good contact for thermal conductivity is assured since the lower rings support the weight of the die and the upper copper ring is held in contact by a spring loaded plate, not shown.

Die 38 at the upper portion thereof has an internal cross-sectional configuration matching that of the shape to be hot pressed. Lower portion 39 of die 38 has a larger internal cross-section than the upper portion and functions as a protective and cooling zone for an emerging finished hot pressed shape. The zone 41 where the internal cross-section of die 38 changes is located within the hot zone of the furnace so that the section of the die from which the pressed shape emerges will not become restricted because of cooling.

Access for making optical pyrometric measurements is provided through sight assembly 45 which is hermetically attached to the furnace shell surface. The assembly contains glass ports 46 for viewing in the sight tubes 47. Sight tubes 47, which may be of graphite, extend through openings in the shell 22, and are axially disposed with openings in the sheath and heater tube for viewing the graphite die and to provide access to gas spaces 29 and 31. Gas space 31 comprises the area between the graphite die 38 and heater tube 30. Purge gas entry ports 48 are provided in the sight assembly as a convenient means for introducing purge gas into the furnace assembly. The gas after entering through the inlets 48 passes through sight tubes 47 in the gas space zones 29 and 31. Openings are provided in the steel lid or cover plate 24 as exits for the purge gas circulating through the hot pressing furnace assembly. The function of the purge gas system is to maintain the interior of the furnace assembly free of reactive gases during the hot pressing operation. The purge gas can be any suitable non-reactive gas, such as argon or nitrogen.

The force required for pressing the powder into solid fabricated shapes is obtained from a hydraulic system which includes a hydraulic pump, not shown in the drawings, and which actuates the hydraulic cylinder assembly 12.

Figure 3:
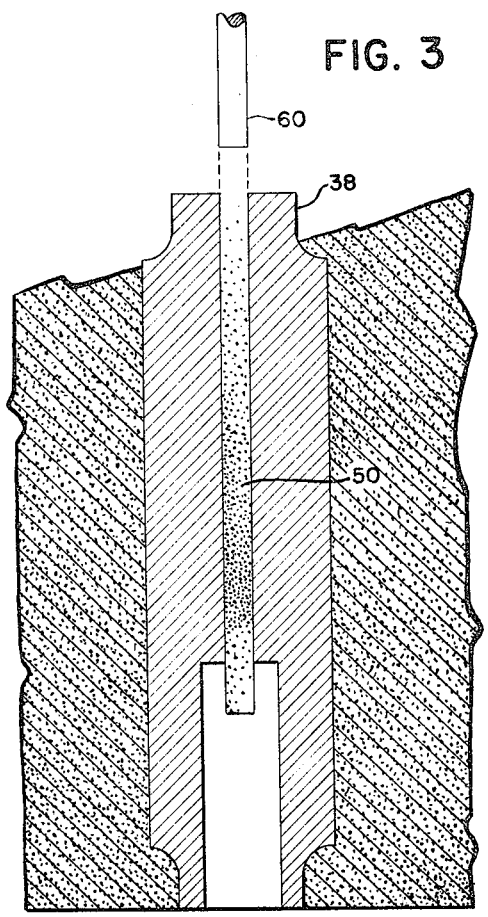
FIG. 3 is a cross-sectional view of the furnace die and depicts one embodiment for hot pressing material in a continuous manner according to the instant invention.

In FIG. 3 there is shown an embodiment of the invention wherein the hot pressing is accomplished in a continuous basis. In this embodiment, powdered feed material is charged into the upper portion of die 38. The powder is heated to the sintering temperature, and then the hydraulic cylinder assembly 12 is actuated to apply pressure to the powder through a graphite plunger 60. Graphite plunger 60 is preferably attached by any suitable means to the piston rod 11 of hydraulic cylinder assembly 12. The pressure applied from the hydraulic cylinder assembly compacts the powdered charge by acting against the friction of the wall and charge.

In operation, the plunger 60 is removed from the furnace die 38, feed in the form of the powder to be pressed is added to the die and the plunger reinserted and pressure applied. For the initial compaction a plug at the change of the internal cross-sectional area of die 38 or other suitable means is used. Once initial compaction is reached, the plug may be removed and wall friction is relied upon for attaining proper density at a feed rate adjusted to give proper heating to the charge. The plunger 60 is removed, additional powder added, and the cycle is repeated. The finished hot pressed piece is pushed into the enlarged zone 39 and from there can emerge into a suitable container for cooling. By this technique it is now possible to hot press or extrude elongated sections of substantial length of super refractory material and the like.

Figure 4:
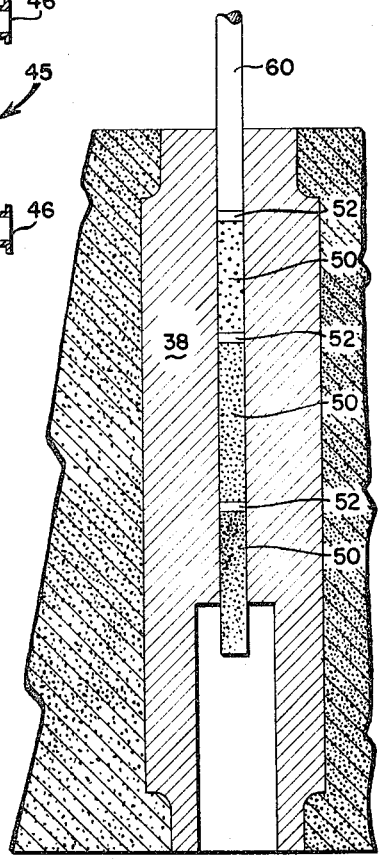
FIG. 4 depicts a second embodiment for carrying out the instant invention.

FIG. 4 is similar to FIG. 3 except that graphite pads 52 are inserted between powder charges 50 during the hot pressing operation.

A series of hot pressings performed according to the continuous hot pressing technique described above in relation to FIGS. 3 and 4 have been performed on various powder materials including mixtures of titanium diboride and titanium carbide ($TiB_2+TiC$) and alumina ($Al_2O_3$). The short residence time of the powder in the hot press points out the important economic advantage of the continuous technique of hot pressing realized by this invention. However, an additional unexpected advantage is obtained. The pressed shapes made according to the invention have a high modulus of rupture; substantially higher than that of the shapes of the same composition hot pressed in the conventional manner and of the same density. A possible explanation for this is that the lower retention time in the hot press in the continuous technique of the invention prevents or substantially eliminates the growth of crystallites of grains which would form planes of weakness. These advantages are shown in the following examples.

*Example A*

Twenty rods of a circular cross-section and having dimensions of 1⅛ inches diameter by 4 inches in length were produced by the technique described in relation to FIG. 4. Powdered material (70% $TiB_2$ and 30% $TiC$) was placed in the die 38 and pressed at a sintering temperature of 2040° C. In these tests, the lower portion of die 38 (which has an enlarged cross-sectional area)

had a diameter of 1 3/8 inches. Rods of the dimensions mentioned above were expelled from the die at the rate of one each 4 minutes. The rods had the following typical properties:

Density—93% of theoretical density
Modulus of rupture—40,000 p.s.i.
Specific resistivity—18.8 microhm-cm.

*Example B*

An alumina rod was hot pressed using the technique described in relation to FIG. 3. A rod 1 1/8" in diameter by 25" length was continuously hot pressed at a sintering temperature of 1550° C. The hot pressed or extruded rod had a density of 95% of theoretical density.

Various shapes, other than those described in the examples, may be made by the disclosed continuous hot pressing technique.

It is apparent that various changes and modifications may be made without departing from the spirit and scope of the invention, the invention being limited only as defined in the following claims, wherein what is claimed is:

1. A continuous method of hot pressing powdered refractory material into an elongated body having a high modulus of rupture comprising the steps of periodically charging increments of powdered refractory material into an open end elongated die, subjecting the powdered material to progressively increasing pressure while progressively raising the temperature of the material to the sintering temperature, maintaining the powdered material at said sintering temperature while further subjecting the material to pressure for a time sufficient to obtain a solid compacted body, and releasing said pressure periodically for the charging of additional increments of powdered material thereby causing the powder to move progressively in said die and the solid body compacted therefrom to progressively emerge from said die.

2. A method according to claim 1 wherein said solid compacted body emerges from said die into a protected cooling zone free of reactive gases.

3. A continuous method of hot pressing powdered refractory material into solid compacted bodies having high moduli of rupture comprising the steps of charging increments of powdered refractory material into an open end elongated die, each of said increments of powdered material being sufficient in amount to form a compacted body and being separated from each other when in said die by a solid pad member having a size and shape to fit the internal configuration of said die, subjecting the powdered material to progressively increasing pressure while progressively raising the temperature of the powdered material to the sintering temperature, maintaining said powdered material at said sintering temperature while further subjecting the material to pressure for a time sufficient to obtain a solid compacted body, and releasing said pressure periodically for the charging of additional increments of powdered material thereby causing the powder to progressively move in said die and the solid bodies compacted therefrom to progressively emerge from said die.

References Cited by the Examiner

UNITED STATES PATENTS

| | | | |
|---|---|---|---|
| 1,541,584 | 6/1925 | Miller | 264—102 |
| 1,904,197 | 4/1933 | Bond | 264—112 |
| 2,076,315 | 4/1937 | Albrecht. | |
| 2,097,502 | 11/1937 | Southgate | 18—59.3 X |
| 2,261,196 | 11/1941 | Wellman et al. | 75—22X |
| 2,348,172 | 5/1944 | Taylor. | |
| 2,728,128 | 12/1955 | Sheer et al. | |
| 2,844,845 | 7/1958 | Krall. | |
| 2,902,714 | 9/1959 | Johnson. | |
| 2,932,565 | 4/1960 | Chisholm et al. | 18—59.2X |
| 2,964,400 | 12/1960 | Brennan | 264—56 X |
| 2,996,759 | 8/1961 | Smith | 264—109 |
| 3,014,238 | 12/1961 | Morse. | |
| 3,119,148 | 1/1964 | Chambers et al. | 264—40 X |

FOREIGN PATENTS

| | | |
|---|---|---|
| 1,062,604 | 7/1959 | Germany. |
| 380,824 | 9/1932 | Great Britain. |
| 719,611 | 12/1954 | Great Britain. |
| 431,572 | 3/1948 | Italy. |

ALEXANDER H. BRODMERKEL, *Primary Examiner.*

WILLIAM J. STEPHENSON, *Examiner.*

P. E. ANDERSON, *Assistant Examiner.*